(12) United States Patent
Tezuka et al.

(10) Patent No.: US 8,159,096 B2
(45) Date of Patent: Apr. 17, 2012

(54) APPARATUS FOR DETECTING POSITION OF ROTATION OF MOTOR

(75) Inventors: Shunichi Tezuka, Azumino (JP); Junji Koyama, Azumino (JP); Kunio Miyashita, Azumino (JP)

(73) Assignee: Harmonic Drive Systems Inc., Shinagawa-Ku, Tokyo (JP)

( * ) Notice: Subject to any disclaimer, the term of this patent is extended or adjusted under 35 U.S.C. 154(b) by 358 days.

(21) Appl. No.: 12/602,892

(22) PCT Filed: Jun. 22, 2007

(86) PCT No.: PCT/JP2007/000677
§ 371 (c)(1),
(2), (4) Date: Dec. 3, 2009

(87) PCT Pub. No.: WO2009/001399
PCT Pub. Date: Dec. 31, 2008

(65) Prior Publication Data
US 2010/0176695 A1    Jul. 15, 2010

(51) Int. Cl.
*H02K 11/00* (2006.01)
(52) U.S. Cl. ......................... 310/68 B; 310/71
(58) Field of Classification Search ................. 310/68 B, 310/71, 67 R
See application file for complete search history.

(56) References Cited

U.S. PATENT DOCUMENTS

| | | | | |
|---|---|---|---|---|
| 4,086,519 A * | 4/1978 | Persson | | 318/400.38 |
| 4,982,125 A * | 1/1991 | Shirakawa | | 310/88 |
| 6,225,716 B1 * | 5/2001 | Sies et al. | | 310/68 B |
| 8,004,134 B2 * | 8/2011 | Abe et al. | | 310/83 |
| 2007/0210658 A1 * | 9/2007 | Terauchi et al. | | 310/68 B |
| 2009/0079280 A1 * | 3/2009 | Terauchi et al. | | 310/71 |

FOREIGN PATENT DOCUMENTS

| | | |
|---|---|---|
| JP | 3-54352 U | 5/1991 |
| JP | 3-120675 U | 12/1991 |
| JP | 5-292729 A | 11/1993 |
| JP | 2006-166491 A | 6/2006 |
| JP | 2007-115794 A | 5/2007 |

OTHER PUBLICATIONS

International Search Report (PCT/ISA/210) dated Sep. 11, 2007 for PCT/JP2007/000677.

* cited by examiner

*Primary Examiner* — Thanh Lam
(74) *Attorney, Agent, or Firm* — Buchanan Ingersoll & Rooney PC

(57) ABSTRACT

A magnetic absolute sensor for a geared motor comprises a dipole magnet and hall elements. The dipole magnet is fixed to a hollow portion of a hollow rotor shaft. A bracket attached to an end plate of a motor housing is coaxially inserted from the rear end side of the hollow portion. The dipole magnet is inserted from the front side in a cylindrical portion of the bracket. The hall elements are arranged at an interval of 90 degree on the circular inner periphery surface of the cylindrical portion. The hall elements face the circular outer periphery surface of the dipole magnet with a fixed gap therebetween. It is not necessary to increase a motor shaft length in order to incorporate the magnetic absolute sensor. The flux of a motor driven magnet is blocked by the hollow rotor shaft and the hall elements are not adversely affected.

3 Claims, 3 Drawing Sheets

(PRIOR ART)

APPARATUS FOR DETECTING POSITION OF ROTATION OF MOTOR

TECHNICAL FIELD

The present invention relates to a magnetic encoder, an optical encoder, or another rotational position detecting apparatus installed in a motor in order to detect the rotational position of the motor, and particularly relates to a rotational position detecting apparatus suitable for manufacturing a flat, small-sized motor having a short shaft.

BACKGROUND ART

Geared motors, configured so that the output rotation of the motor is outputted via a reducer having high transmitting precision, are used as drive components which require high positioning precision in industrial robots and machine tools. FIG. 3 shows an example of a geared motor. A geared motor 101 has a motor unit 102 and a reduction mechanism 103. The reduction mechanism 103 comprises a reducer 104 coaxially connected to a motor shaft 102a of the motor unit 102, and an output shaft 105 coaxially connected to the output side of the reducer 104. A wave gear drive, for example, is used as the reducer 104.

In the geared motor 101, the rotational angle of the output shaft 105 of the reduction mechanism 103 must be controlled with high precision in order to efficiently carry out the positioning and other tasks. To this end, a motor encoder 106 is mounted on the motor shaft 102a. A command is sent to a motor driver 109 in a signal processing circuit 108 so that the output shaft 105 reaches the desired rotational angle on the basis of A, B, and Z phase signals obtained from the motor encoder 106. The motor driver 109 rotatably drives the motor unit 102 in accordance with the received command. In the geared motor 101, the rotational angle position thereof is controlled based on the mechanical origin of the output shaft 105. Therefore, during activation and other such times, the output shaft 105 is returned to the mechanical origin (the origin position).

The motor encoder 106 for detecting the rotational position of the motor unit 102 is commonly mounted on the rear portion of the motor unit 102. If the installation space for the motor encoder 106 could be omitted, the shaft length of the motor unit 102 could be proportionately reduced, and a flatter profile could be obtained.

In cases in which a space for installing the motor encoder 106 in the motor unit 102 cannot be reliably provided, a possible option is to place the motor encoder 106 on the load side. In this case, the output shaft of the reduction mechanism must be lengthened in order to ensure an installation space for the motor encoder 106. When the output shaft is lengthened, adverse effects occur in which the moment rigidity and other characteristics of the reduction mechanism are reduced.

DISCLOSURE OF THE INVENTION

In view of these circumstances, an object of the present invention is to provide a motor rotational position detection apparatus whose structure is advantageous for being installed in a flat motor having a short shaft.

In order to achieve the objects described above, the motor rotational position detection apparatus of the present invention is characterized in comprising:

a rotating unit which is integrated with a rotor of a motor and which rotates around a center axis of the motor;

a detection unit for detecting the rotational position of the rotating unit;

a rotor hollow portion extending concentrically from one shaft end surface of the motor rotor; and a bracket protruding into the interior of the rotor hollow portion from a region of a motor housing which faces the shaft end surface; wherein the rotating unit is fixed to the motor rotor in the interior of the rotor hollow portion; and the detection unit is fixed to the bracket in the interior of the rotor hollow portion in a state of facing the rotating unit from either a direction along the center axis of the motor or a radial direction.

In the motor rotational position detection apparatus of the present invention, the rotating unit and detection unit of the rotational position detection apparatus are disposed in the interior of the rotor hollow portion. Therefore, it is not necessary to increase the shaft length of the motor rotor in order to ensure installation space for the rotating unit and detection unit of the rotational position detection apparatus. Consequently, a flat, small-sized motor having a short shaft can be obtained.

Preferably, in cases in which a magnetic sensor is used as the rotational position detection apparatus, the rotating unit is a ring-shaped or discoid magnet having a circular outer periphery surface subjected to multipolar magnetization along a circumferential direction, the magnet is coaxially fixed to the motor rotor in the interior of the rotor hollow portion, the detection unit is composed of a plurality of magnetic detection elements arranged at fixed intervals around the circular outer periphery surface of the magnet, a cylindrical portion coaxially encircling the magnet in the interior of the rotor hollow portion is formed in the bracket, and the magnetic detection elements are mounted at predetermined angular intervals on an inner periphery surface of the cylindrical portion along the circumferential direction.

In cases in which the magnet is a dipole magnet, at least two Hall elements or MR elements arranged at 90 degree angular intervals on the inner periphery surface of the cylindrical portion are preferably used as the magnetic detection elements. If so, sinusoidal A-phase and B-phase signals whose phases differ by 90 degrees are obtained from the magnetic detection elements along with the rotation of the motor rotor. Rotational information of the motor rotor can be obtained from these signals by performing conventional signal processing.

BEST MODE FOR CARRYING OUT THE INVENTION

Embodiments of a geared motor to which the present invention is applied are described hereinbelow with reference to the drawings.

(Overall Configuration)

Figure 1:
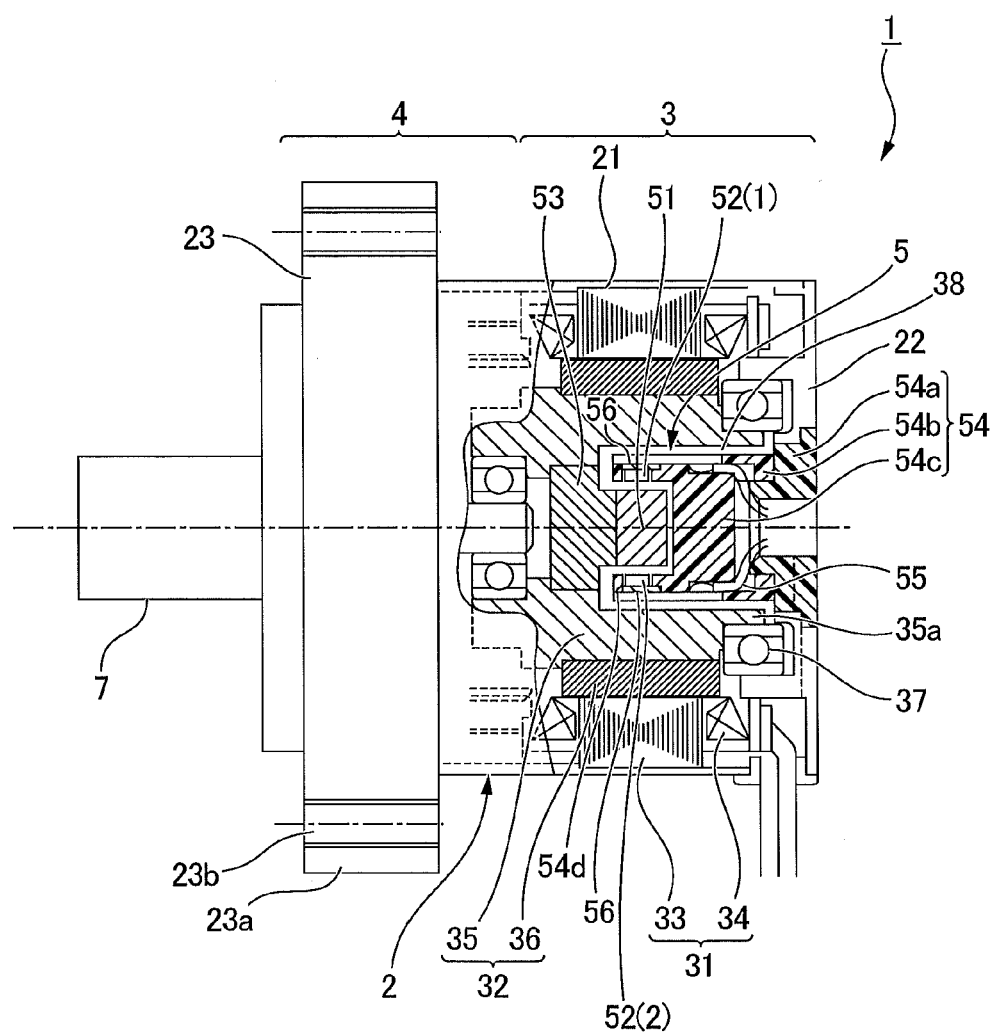
FIG. 1 is an explanatory view showing a geared motor according to the present invention with partially shown in cross section.

FIG. 1 is a schematic view showing a geared motor to which the present invention is applied, and showing its partial portion in cross section so that the internal configuration of the rear end portion can be understood. A geared motor 1 has a motor housing 2, and a motor unit 3 and reduction mechanism 4 incorporated inside the motor housing 2. A magnetic absolute sensor 5 for detecting the motor rotational position is also incorporated in the motor unit 3.

The motor housing 2 comprises a motor-side cylindrical housing 21, a rear end plate 22 which seals off a rear end opening of the motor-side cylindrical housing 21, and a thick reducer-side cylindrical housing 23 fixedly connected in a coaxial state to the front side of the motor-side cylindrical housing 21.

The motor unit 3 is incorporated inside the motor-side cylindrical housing 21, and the motor unit 3 comprises a motor stator 31 fixed to the inner periphery surface of the motor-side cylindrical housing 21, and a motor rotor 32 coaxially disposed on the inner side of the motor stator 31. The motor stator 31 comprises an annular stator core 33 coaxially fixed to the inner periphery surface of the motor-side cylindrical housing 21, and drive coils 34 wound around the stator core.

The motor rotor 32 comprises a hollow rotor shaft 35, and a driven magnet 36 coaxially fixed to the circular outer periphery surface of the hollow rotor shaft 35. The driven magnet 36 stands face to face with the inner periphery surface of the stator core 33 with a fixed gap therebetween. A rear end part 35a of the rotor shaft 35 is rotatably supported via a bearing 37 on the side of the rear end plate 22 of the motor housing 2.

The reduction mechanism 4 is configured from a planetary reduction gear mechanism, a wave gear mechanism, or another reduction mechanism. The reduction mechanism 4 comprises a rotation input element connected to the motor rotor 32, and a reduced rotation output element connected to an output shaft 7. For example, in the case of a planetary reduction gear mechanism, the rotation input element is a sun gear, and the rotation output element is a planetary carrier. In the case of a wave gear drive, the rotation input element is a wave generator, and the rotation output element is a flexible externally toothed gear.

A flange portion 23a which broadens outward is formed on the outer periphery portion of the front end of the reducer-side cylindrical housing 23, and bolt holes 23b are formed therein for fixing the geared motor 1 to a fixed-side member (not shown).

(Sensor Mounting Structure)

FIGS. 2(a) through (c) are schematic views showing the mounted state of the absolute sensor 5, a development diagram showing a state in which a flexible printed circuit board on which Hall elements are mounted is developed on a flat surface, and a wiring diagram of the Hall elements.

Figure 2:
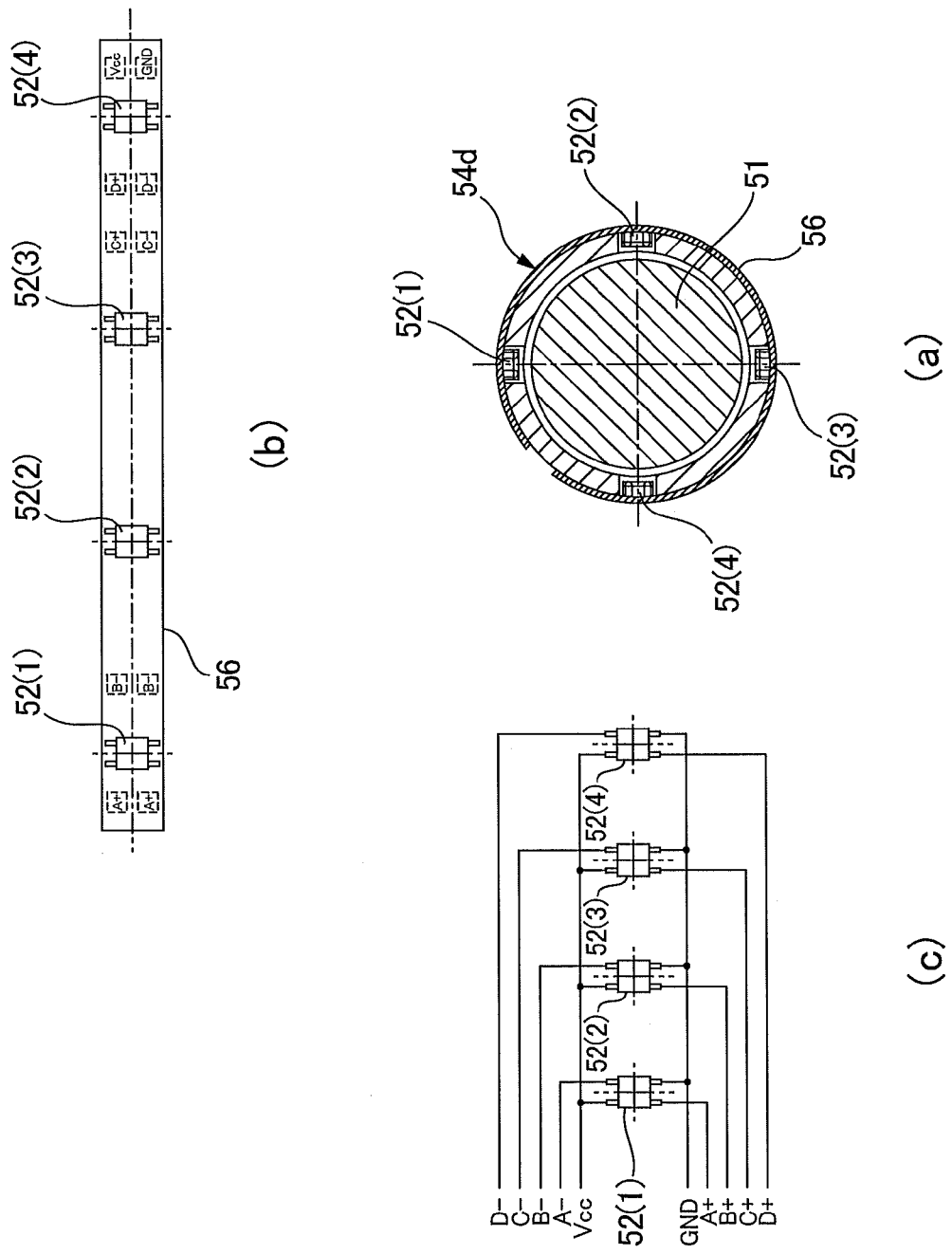
FIG. 2(a) is an explanatory view showing the mounted state of the absolute sensor in the geared motor of FIG. 1.
FIG. 2(b) is a development view showing a state in which a flexible printed circuit board on which Hall elements are mounted is developed on a flat surface.
FIG. 2(c) is a wiring diagram of the Hall elements.
Figure 3:
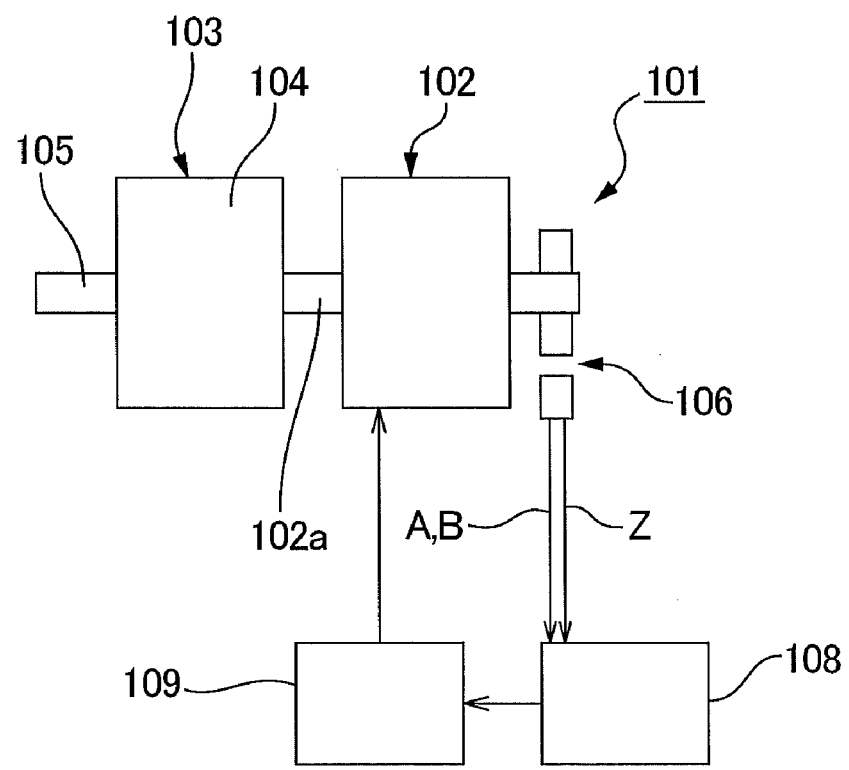
FIG. 3 is a schematic view showing a conventional geared motor.

Referring to FIGS. 1 and 2, the absolute sensor 5 for detecting the motor rotational position comprises a discoid dipole magnet 51 and four Hall elements 52(1) to 52(4), which are disposed inside a hollow portion 38 of the hollow rotor shaft 35.

In the hollow portion 38, the rear side is a large-diameter hollow portion, and the front side is a small-diameter hollow portion. A magnet-mounting member 53 is fixedly press-fitted into the small-diameter hollow portion, the rear end surface of the magnet-mounting member 53 protrudes into the large-diameter hollow portion, and the dipole magnet 51 is fixedly bonded in a coaxial state thereto.

A bracket 54 is coaxially fixed to the center portion in the inner end surface of the rear end plate 22 of the motor housing 2. The bracket 54 comprises an annular member 54a fixed to the rear end plate 22, a cylindrical member 54b coaxially fixed to the front side of the annular member 54a, and a holding member 54c coaxially fixed to the front side of the cylindrical member 54b. A cylindrical portion 54d which opens forward is formed in the holding member 54c, and herein the dipole magnet 51 is inserted in a coaxial state from the front side.

The four Hall elements 52(1) to 52(4) are arranged at angular intervals of 90 degrees along the circumferential direction on the inner periphery surface of the cylindrical portion 54d, and the Hall elements stand face to face with the circular outer periphery surface of the dipole magnet 51 with the same gap therebetween. Lead wires 55 drawn out from the Hall elements 52(1) to 52(4) are drawn out to the rear side of the motor through a center hole in the annular member 54a on the rear side of the bracket 54.

The Hall elements 52(1) to 52(4) are placed at fixed intervals on the front surface of a narrow flexible printed circuit board 56, as shown in FIG. 2. The flexible printed circuit board 56 is bent into an arcuate shape so that the front surface becomes the inner side, in which state the flexible printed circuit board 56 is mounted to the circular outer periphery surface of the cylindrical portion 54d at the front side of the bracket 54. In this mounted state, the four Hall elements 52(1) to 52(4) are arranged at 90 degree angular intervals around the rotational center of the hollow rotor shaft 35. Lands (the rectangular portions shown by dashed lines in FIG. 2(b)) for connecting wires are formed in 10 locations on the reverse surface of the flexible printed circuit board 56. The rotational position can be detected using two Hall elements arranged at a 90 degree angular interval, but using two sets of Hall elements is effective for minimizing detection signal wave error components caused by wobbling of the hollow rotor shaft 35.

When the hollow rotor shaft 35 completes one rotation, sinusoidal detection signals differing in phase by 90 degrees are outputted at a rate of one cycle per rotation from the Hall elements 52(1) and 52(2) arranged at a 90 degree interval. Sinusoidal detection signals differing in phase by 90 degrees in phases opposite to the Hall elements 52(1) and 52(2) are similarly outputted at a rate of one cycle per rotation from the Hall elements 52(3) and 52(4). The absolute position of the hollow rotor shaft 35 is detected based on these detection signals.

(Operational Effects)

As described above, in the geared motor 1 of the present example, the dipole magnet 51 and the Hall elements 52(1) to 52(4) constituting the absolute sensor 5 are arranged using the hollow portion 38 of the hollow rotor shaft 35. Therefore, it is not necessary to increase the motor shaft length in order to arrange these components, which is advantageous for flattening the motor.

The magnetic absolute sensor 5 is placed in the hollow portion 38 of the hollow rotor shaft 35, which functions as a back yoke of the driven magnet 36. Therefore, the Hall elements 52(1) to 52(4) can be protected against adverse effects from the driven magnet 36, because the flux from the driven magnet 36 of the motor is blocked by the hollow rotor shaft 35.

Other Embodiments

Another form of sensor besides a magnetic absolute sensor can be used as the sensor for detecting the rotational position of the output shaft. For example, a rotary encoder or an optical encoder can also be used.

In the above embodiment, the Hall elements were arranged in locations opposing the outer periphery side of the magnet. Alternatively, a magnet that is magnetized on a circular end surface along the circumferential direction may be placed inside the rotor hollow portion, and Hall elements or other magnetic detection elements may be arranged facing the circular end surface of this magnet.

The invention claimed is:

1. A motor rotational position detection apparatus, characterized in comprising:
   a rotating unit which rotates integrally with a motor rotor around a motor center axis;
   a detection unit for detecting a rotational position of the rotating unit;
   a rotor hollow portion extending concentrically from one shaft end surface of the motor rotor; and
   a bracket protruding into an interior of the rotor hollow portion from a region of a motor housing which faces the shaft end surface; wherein
   the rotating unit is fixed to the motor rotor in the interior of the rotor hollow portion; and
   the detection unit is fixed to the bracket in the interior of the rotor hollow portion in a state of facing the rotating unit from either a direction along the motor center axis or a radial direction.

2. The motor rotational position detection apparatus according to claim 1, wherein:
   the rotating unit has a magnet having a circular outer periphery surface that has been subjected to multipolar magnetization along a circumferential direction thereof;
   the magnet is coaxially fixed to the motor rotor in the interior of the rotor hollow portion;
   the detection unit has a plurality of magnetic detection elements arranged at fixed intervals around a circular outer periphery surface of the magnet;
   the bracket has a cylindrical portion coaxially encircling the magnet in the interior of the rotor hollow portion; and
   the magnetic detection elements are mounted at predetermined angular intervals on an inner periphery surface of the cylindrical portion along a circumferential direction thereof.

3. The motor rotational position detection apparatus according to claim 2, wherein:
   the magnet is a dipole magnet; and
   the magnetic detection elements are at least two Hall elements or MR elements arranged at 90 degree angular intervals on the inner periphery surface of the cylindrical portion.

* * * * *